(12) United States Patent
Tsuruta

(10) Patent No.: US 8,188,964 B2
(45) Date of Patent: May 29, 2012

(54) LIQUID CRYSTAL DISPLAY DEVICE

(75) Inventor: Masayuki Tsuruta, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 746 days.

(21) Appl. No.: 11/964,159

(22) Filed: Dec. 26, 2007

(65) Prior Publication Data

US 2008/0158450 A1   Jul. 3, 2008

(30) Foreign Application Priority Data

Dec. 27, 2006  (JP) ................. 2006-353262

(51) Int. Cl.
*G09G 3/36* (2006.01)
(52) U.S. Cl. .......... 345/100; 345/204; 345/211; 345/92; 345/94
(58) Field of Classification Search .............. 345/87, 345/211–212, 89, 92, 94, 95, 98–100
See application file for complete search history.

(56) References Cited

U.S. PATENT DOCUMENTS

| | | | |
|---|---|---|---|
| 6,621,489 B2 * | 9/2003 | Yanagisawa et al. | 345/211 |
| 6,940,479 B2 * | 9/2005 | Kanbe et al. | 345/87 |
| 2004/0263446 A1 * | 12/2004 | Kawase et al. | 345/87 |
| 2006/0125760 A1 * | 6/2006 | Jee et al. | 345/98 |
| 2006/0181500 A1 * | 8/2006 | Murade | 345/100 |
| 2006/0208994 A1 * | 9/2006 | Kuo et al. | 345/98 |

FOREIGN PATENT DOCUMENTS

| | | |
|---|---|---|
| JP | 2-272490 | 11/1990 |
| JP | 10-73800 | 3/1998 |
| JP | 10-214067 | 8/1998 |
| JP | 11-30975 | 2/1999 |
| JP | 2000-163025 | 6/2000 |
| JP | 2001-22326 | 1/2001 |
| JP | 2002-149120 | 5/2002 |
| JP | 2006-308982 | 11/2006 |

OTHER PUBLICATIONS

Notice of Reasons for Rejection for conterpart Japanese Application No. 2006-353262, mailed on Dec. 20, 2011 (3 pages).

* cited by examiner

*Primary Examiner* — Lun-Yi Lao
*Assistant Examiner* — Sosina Abebe
(74) *Attorney, Agent, or Firm* — Finnegan, Henderson, Farabow, Garrett & Dunner, L.L.P.

(57) ABSTRACT

A liquid crystal display device is composed of a liquid crystal display panel which includes liquid crystal pixels arranged in a matrix form and each having liquid crystal held between a pixel electrode and a common electrode, scanning lines arranged along the rows of pixels, signal lines arranged along the columns of pixels and pixel switching elements arranged near intersections between the scanning lines and the signal lines and each driven via a corresponding scanning line, and a display control circuit which controls the display panel. The display control circuit is configured to simultaneously drive all of the scanning lines, transition the potentials of the signal lines to a value substantially equal to potential of the common electrode in a state where the scanning lines are driven within a one-frame period, and turn off a power source after a preset period of time required for the transition has elapsed.

3 Claims, 3 Drawing Sheets

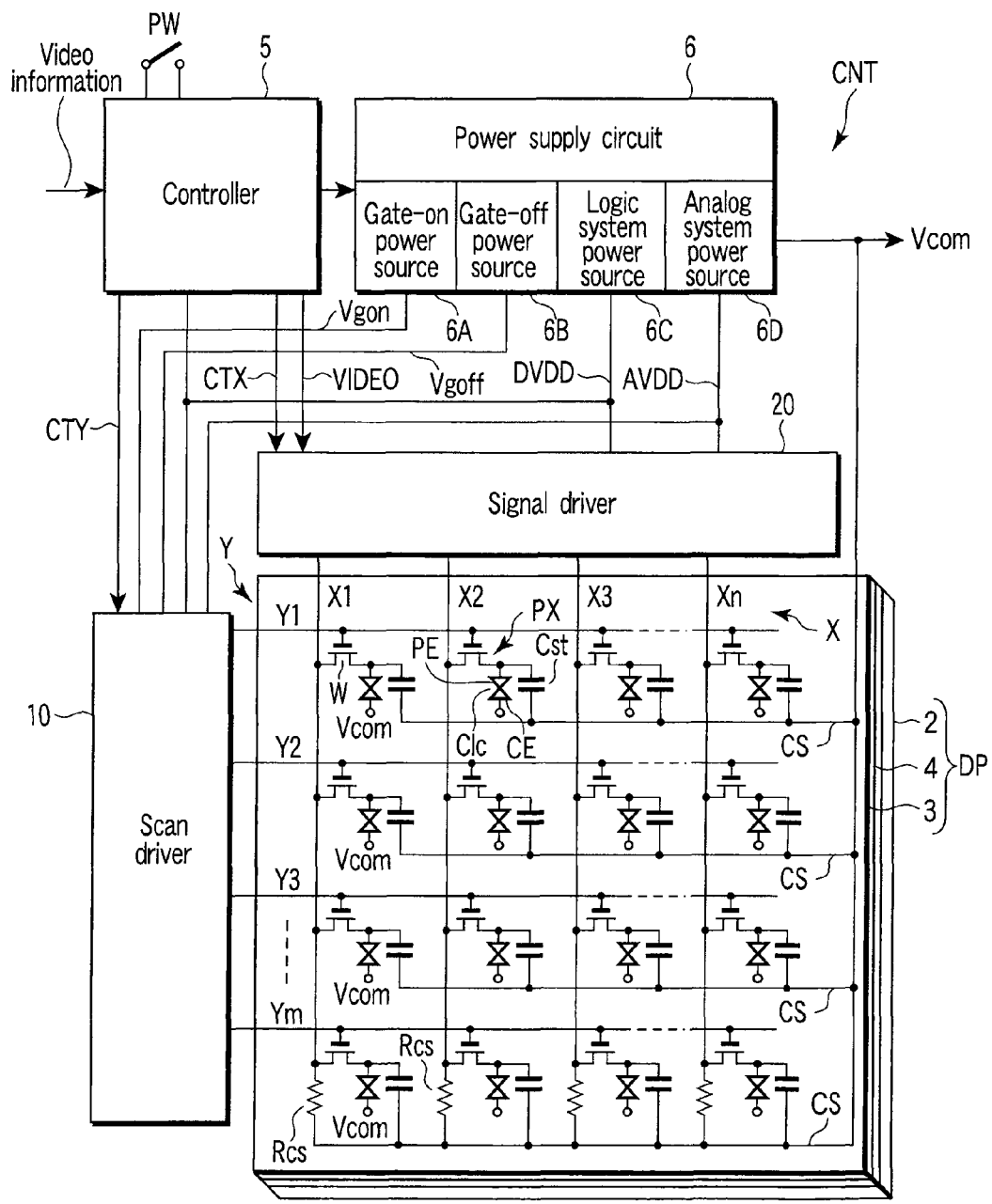
F I G. 1

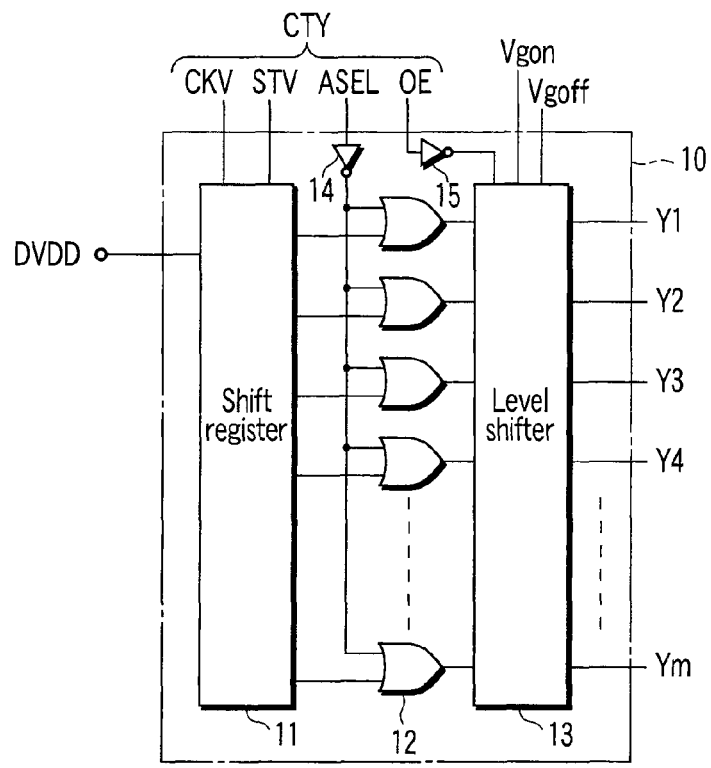
F I G. 2
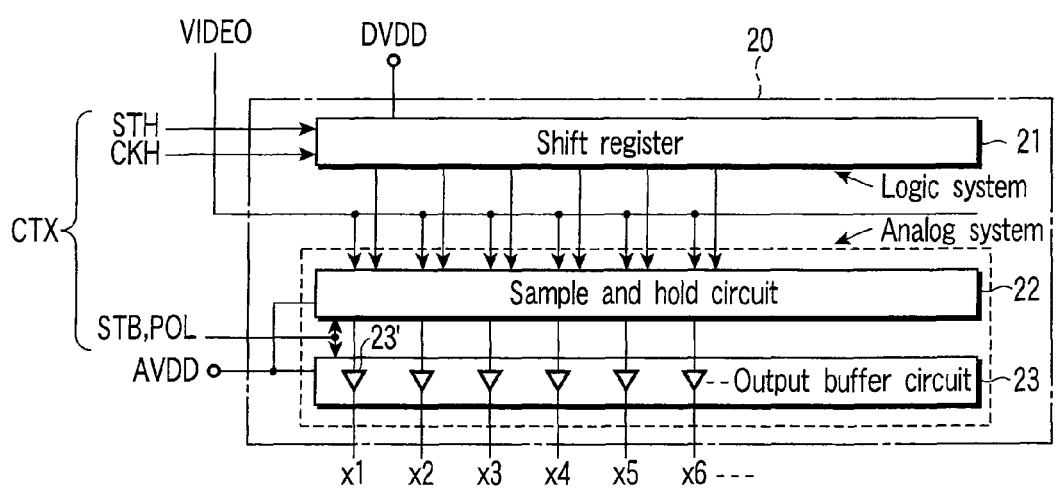
F I G. 3

LIQUID CRYSTAL DISPLAY DEVICE

CROSS-REFERENCE TO RELATED APPLICATIONS

This application is based upon and claims the benefit of priority from prior Japanese Patent Application No. 2006-353262, filed Dec. 27, 2006, the entire contents of which are incorporated herein by reference.

BACKGROUND OF THE INVENTION

1. Field of the Invention

This invention generally relates to a liquid crystal display device having a liquid crystal display panel in which a plurality of liquid crystal pixels are arranged substantially in a matrix form and more particularly to the liquid crystal display device in which every liquid crystal pixel contains an area that reflects ambient light to display an image.

2. Description of the Related Art

The liquid crystal display panel is widely used to display an image in a portable information terminal such as a portable telephone or a personal digital assistant (PDA). It is strongly desired to enhance the performance, for example, miniaturization, power saving, cost reduction and the like for the above device. In order to satisfy the above requirement, a reflective-type liquid crystal display panel using ambient light as a light source, and a transreflective-type liquid crystal display panel using a combination of backlight and ambient light as a light source are actively developed.

Generally, the liquid crystal display panel has a structure in which a liquid crystal layer is held between an array substrate and a counter-substrate. In the reflection liquid crystal display panel, the array substrate includes a plurality of light-reflective pixel electrodes arranged in a matrix form, a plurality of signal lines arranged along the columns of pixel electrodes, a plurality of scanning lines arranged along the rows of pixel electrodes, and a plurality of switching elements formed of thin-film transistors or the like which are respectively driven by use of the corresponding scanning lines to connect the corresponding signal lines to the corresponding pixel electrodes. Further, the counter-substrate has a light-transmissive common electrode and color filter arranged to face the pixel electrodes disposed on the array substrate side. The pixel electrodes and common electrode are entirely covered with a pair of alignment films arranged adjacent to the liquid crystal layer, and the array substrate and counter-substrate are covered with a pair of polarizers attached to the opposite surfaces with respect to the liquid crystal layer. Each pixel electrode and common electrode configure a liquid crystal pixel in association with a pixel region of the liquid crystal layer arranged between the above electrodes, and the alignment direction of liquid crystal molecules in the pixel region is controlled by an electric field corresponding to drive voltage retained between the pixel electrode and the common electrode.

The pixel electrode reflects ambient light incident thereon via the liquid crystal layer from the counter-substrate side as reflection light. When the liquid crystal display panel is of a transreflective-type, for example, each pixel electrode has a reflection electrode portion and a transmission electrode portion formed as a light transmission window surrounded by the reflection electrode portion. The reflection electrode portion reflects ambient light incident thereon via the liquid crystal layer from the counter-substrate side as reflection light and the transmission electrode portion transmits backlight incident thereon from the array substrate side as transmission light.

As a phenomenon in the liquid crystal display panel of a transmissive-type or transreflective-type, persistence appears after turning off of the power source. It is known that the phenomenon is caused by charges retained as a residual voltage between the pixel electrode of each liquid crystal pixel and the common electrode (refer to Jpn. Pat. Appln. KOKAI Publication No. 2000-163025). In the transmissive-type liquid crystal display panel, almost no persistence is observed after backlight disappears.

For example, in the conventional liquid crystal display device disclosed in Jpn. Pat. Appln. KOKAI Publication No. 2000-163025, the scan driver and signal driver are operated to eliminate the residual voltage before the power source is turned off. That is, the scan driver sequentially drives the scanning lines and the signal driver sets the potentials of the signal lines to a level close to the potential of the common electrode while each of the scanning lines is driven. Thus, the potentials of the pixel electrodes of each row are made approximately equal to the potential of the common electrode and the residual voltage is reduced to approximately zero. If the liquid crystal display panel is, for example, of a normally white mode, white display is performed in each liquid crystal pixel when the residual potential is set at approximately zero. However, a one-frame period (=16.7 ms) or more is required to cause all of the liquid crystal pixels to perform white display.

BRIEF SUMMARY OF THE INVENTION

This invention is made according to the above problem and an object thereof is to provide a liquid crystal display device which can rapidly eliminate the residual voltages of all of the liquid crystal pixels.

According to one aspect of the present invention, there is provided a liquid crystal display device comprising a liquid crystal display panel which includes a plurality of liquid crystal pixels arranged in substantially a matrix form and each having liquid crystal held between a pixel electrode and a common electrode, a plurality of scanning lines arranged along the rows of liquid crystal pixels, a plurality of signal lines arranged along the columns of liquid crystal pixels and a plurality of pixel switching elements arranged near intersections between the scanning lines and the signal lines and each driven via a corresponding scanning line to set the potential of a corresponding signal line to the pixel electrode of a corresponding liquid crystal pixel, and a display control circuit which controls the liquid crystal display panel, wherein the display control circuit is configured to simultaneously drive all of the scanning lines, transition the potentials of the signal lines to a value substantially equal to potential of the common electrode in a state where the scanning lines are driven within a one-frame period, and turn off a power source after a preset period of time required for the transition has elapsed.

In the above liquid crystal display device, the display control circuit simultaneously drives all of the scanning lines, transitions the potentials of the signal lines to a value substantially equal to the potential of the common electrode in a state where the scanning lines are driven within the one-frame period, and turns off the power source after the preset period of time required for the transition has elapsed. As a result, the potentials of the pixel electrodes can be set to a value substantially equal to the potential of the common electrode in a shorter period of time in comparison with a case where the potentials of the pixel electrodes are transitioned in units of a pixel row as in the conventional case. Therefore, residual voltages of all of the liquid crystal pixels can be rapidly eliminated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram schematically showing the circuit configuration of a liquid crystal display device according to one embodiment of this invention;

FIG. 2 is a diagram showing an example of the configuration of a scan driver shown in FIG. 1;

FIG. 3 is a diagram showing an example of the configuration of a signal driver shown in FIG. 1.

DETAILED DESCRIPTION OF THE INVENTION

Figure 4:
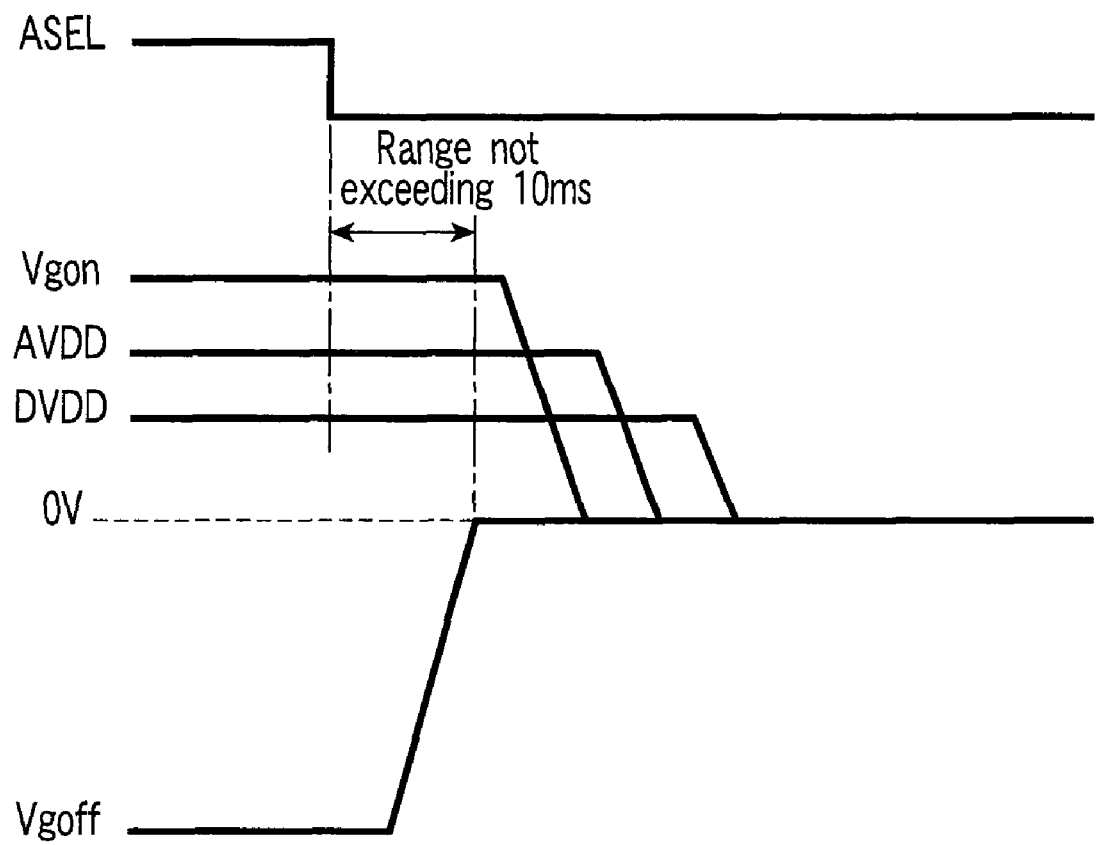
FIG. 4 is a waveform diagram for illustrating the operation of the liquid crystal display device shown in FIG. 1.

A liquid crystal display device according to one embodiment of this invention will be described with reference to the accompanying drawings. FIG. 1 schematically shows the circuit configuration of the liquid crystal display device. The liquid crystal display device includes a reflective-type liquid crystal display DP having a plurality of liquid crystal pixels PX and a display control circuit CNT which controls the liquid crystal display panel DP. The liquid crystal display panel DP has a structure in which a liquid crystal layer 4 is held between an array substrate 2 and a counter-substrate 3.

The array substrate 2 includes a plurality of pixel electrodes PE arranged in a matrix form on a transparent insulating substrate such as a glass plate, a plurality of scanning lines Y (Y1 to Ym) arranged along the rows of pixel electrodes PE, a plurality of signal lines X (X1 to Xn) arranged along the columns of pixel electrodes PE, and a plurality of pixel switching elements W arranged near the intersections between the scanning lines Y and the signal lines X, for example. Each switching element W is formed, for example, of a polysilicon thin-film transistor having a gate connected to one of the scanning lines Y and a source-drain path connected between one of the signal lines X and one of the pixel electrodes PX.

The counter-substrate 3 includes a color filter (not shown) arranged on a transparent insulating substrate such as a glass plate, and a common electrode CE arranged on the color filter to face the pixel electrodes PE, for example. Each pixel electrode PE is formed of a reflective conductive film which reflects light and the common electrode CE is formed of a light transmission conductive film such as ITO which transmits light. The pixel electrodes PE and the common electrode CE cooperate with pixel regions of the liquid crystal layer 4 held therebetween to form liquid crystal pixels PX. Each pixel PX has a liquid crystal capacitance Clc obtained between the pixel electrode PE and the common electrode CE and a storage capacitance Cst connected in parallel with the liquid crystal capacitance Clc. The array substrate 2 has a plurality of storage capacitance lines CS capacitively coupled with the pixel electrodes PE of the respective rows and each storage capacitance Cst is obtained between a corresponding one of the pixel electrodes and a corresponding one of the storage capacitance lines CS. The storage capacitance lines CS are connected to the common electrode CE. Further, as shown in FIG. 1, the signal lines X1 to Xn are connected to the storage capacitance line CS lying in the outermost position via a plurality of electrostatic protection resistors Rcs, respectively. The transmittance of each liquid crystal pixel PX is determined by the alignment state of liquid crystal molecules alignment in the corresponding pixel region, and the alignment state of the liquid crystal molecules is controlled by an electric field corresponding to the drive voltage retained as a difference voltage between the pixel electrode PE and the common electrode CE.

The display control circuit CNT includes a controller 5, power supply circuit 6, scan driver 10, signal driver 20 and power source switch PW. The controller 5 controls the power supply circuit 6, scan driver 10 and signal driver 20 in accordance with an on-operation and off-operation of the power source switch PW. The scan driver 10 is provided to sequentially drive the scanning lines Y1 to Ym and the signal driver 20 is provided to drive the signal lines X1 to Xn in parallel while each of the scanning lines Y is being driven. The power supply circuit 6 is provided to supply power source voltages required for the operations of the controller 5, scan driver 10 and signal driver 20. The power supply circuit 6 includes a gate-on power source 6A which supplies an on-voltage Vgon to turn on the pixel switching element W to the scan driver 10, a gate-off power source 6B which supplies an off-voltage Vgoff to turn off the pixel switching element W to the scan driver 10, a logic system power source 6C which outputs logic system power source voltage DVDD to the controller 5, scan driver 10 and signal driver 20 and an analog system power source 6D which outputs analog system power source voltage AVDD to the signal driver 20 and outputs common voltage Vcom to the common electrode CE. In this example, the logic system power source 6C is configured to output the logic system power source voltage DVDD in response to the ON operation of the power source switch PW but it is not configured to interrupt outputting of the logic system power source voltage DVDD in response to the off-operation of the power source switch PW.

In the operation of controlling the scan driver 10 and signal driver 20, the controller 5 generates a vertical control signal CTY for sequentially driving the scanning lines Y, and a horizontal control signal CTX for respectively assigning video signals VIDEO obtained in units of one row (line) from video information to the signal lines X, for example. The vertical control signal CTY includes a vertical start signal STV which is a pulse generated for each vertical scanning period, a vertical clock signal CKV which includes pulses of a number corresponding to the number of scanning lines and sequentially generated in each vertical scanning period, an output enable signal OE which permits the scanning lines Y1 to Ym to be driven and an all-selection signal ASEL used to simultaneously drive the scanning lines Y1 to Ym. Further, the horizontal control signal CTX includes a horizontal start signal STH which is a pulse generated for each horizontal scanning period, a pixel horizontal clock signal CKH which includes pulses of a number corresponding to the number of signal lines and sequentially generated in each vertical scanning period, a strobe signal STB which is a pulse generated with a preset time delay with respect to the start signal STH for each horizontal scanning period (1H) to drive the signal lines X1 to Xn in parallel according to the video signal VIDEO of one row, and a polarity signal POL which sets the polarity of the pixel voltage with respect to the common voltage Vcom for each horizontal scanning period and for each vertical scanning period. The vertical control signal CTY is supplied from the controller 5 to the scan driver 10, and the horizontal control signal CTX is supplied from the controller 5 to the signal driver 20 together with the video signal VIDEO.

FIG. 2 shows an example of the configuration of the scan driver 10. In the configuration example, the scan driver 10 includes a shift register 11, a plurality of OR gate circuits 12 and level shifter 13. The shift register 11 shifts the vertical start signal STV in synchronism with the vertical clock signal CKV and outputs the vertical start signal STV sequentially from the output terminals as selection signals for the scanning lines Y1 to Ym. The OR gate circuits 12 output the selection signals sequentially supplied for the scanning lines Y1 to Ym from the shift register 11 to the level shifter 13, and output the all-selection signal ASEL commonly supplied for the scanning lines Y1 to Ym via an inverter 14 to the level shifter 13. The level shifter 13 outputs the on-voltage Vgon to each scanning line Y selected by the selection signal or all-selection signal ASEL and the off-voltage Vgoff to each non-selected scanning line Y while the output enable signal OE is being supplied via an inverter 15. Although not shown in FIG. 2, the logic system power source voltage DVDD is supplied to not only the shift register 11 but also the OR gate circuits 12 and inverters 14, 15.

FIG. 3 shows an example of the configuration of the signal driver 20. The signal driver 20 includes a shift register 21, sample and hold circuit 22 and output buffer circuit 23. The shift register 21 shifts the horizontal start signal STH in synchronism with the horizontal clock signal CKH and outputs the horizontal start signal STH as sample timing signals of the video signal VIDEO sequentially from the output terminals thereof respectively provided for the signal lines X1 to Xn. The sample and hold circuit 22 samples the video signal VIDEO in response to the sample timing signals sequentially output from the shift register 21, holds a plurality of sampled values obtained by the sampling operation in parallel, sets the sampled values to have the polarities expressed by the polarity signal POL and then simultaneously outputs the thus obtained sampled values to the output buffer circuit 23 in response to the strobe signal STB. The output buffer circuit 23 amplifies the sampled values to pixel voltages suitable for the liquid crystal display panel DP and outputs the pixel voltages to the respective signal lines X1 to Xn in parallel. In the output buffer circuit 23, a plurality of output buffers 23' are respectively provided for the signal lines X1 to Xn. Each of the output buffers 23' is kept in a high-impedance state while the strobe signal STB is not supplied and outputs pixel voltages only while the strobe signal STB is being supplied. As shown in FIG. 3, the logic system power source voltage DVDD is supplied to the shift register 21 and the analog system power source voltage AVDD is supplied to the sample and hold circuit 22 and output buffer circuit 23.

In the liquid crystal display device, the controller 5 is triggered by the logic system power source voltage DVDD supplied from the logic system power source 6C in response to the on-operation of the power source switch PW to start the control operation of controlling the power supply circuit 6, scan driver 10 and signal driver 20. The controller 5 first controls the power supply circuit 6 to sequentially output the analog system power source voltage AVDD, common voltage Vcom, on-voltage Vgon and off-voltage Vgoff. Then, it controls the scan driver 10 to sequentially drive the scanning lines Y1 to Ym for each horizontal scanning period and controls the signal driver 20 to drive the signal lines X1 to Xn in parallel while each scanning line Y is being driven. When the scan driver 10 outputs the on-voltage Von to the scanning line Y1 and the off-voltages Voff to the remaining scanning lines Y2 to Ym, only the pixel switching elements W corresponding to the scanning line Y1 are turned on. If the signal driver 20 outputs pixel voltages corresponding to the video signal VIDEO of one row in parallel to the signal lines X1 to Xn during this period of time, the pixel voltages are applied from the signal lines X1 to Xn to the pixel electrodes PE of the first row via the pixel switching elements W. Thus, the pixel voltages are sequentially applied to the pixel electrodes PE of the entire rows. Since the pixel switching elements W of each row are set in a conductive state only for one horizontal scanning period and is then made nonconductive, every liquid crystal pixel PX of a corresponding row holds the drive voltage as a potential difference between the pixel electrode PE and the common electrode CE. The controller 5 repeatedly performs the above control operation for each vertical scanning period.

Further, the controller 5 outputs the all-selection signal ASEL in response to the off-operation of the power source switch PW and controls the scan driver 10 to simultaneously drive all of the scanning lines Y1 to Ym. Then, it controls the signal driver 20 to transition the potentials of the signal lines X1 to Xn to a value substantially equal to the potential of the common electrode CE in this state and controls the power supply circuit 6 to turn off the power source after a preset time (within 10 ms) corresponding to the transition time τ required for the above transition has elapsed.

When the all-selection signal ASEL is output from the controller 5 to the scan driver 10 in synchronism with a fall shown in FIG. 4, the all-selection signal ASEL is supplied from the OR gate circuits 12 to the level shifter 13 and then the level shifter 13 outputs the on-voltages Von to all of the scanning lines Y1 to Ym. As a result, the pixel switching elements W are simultaneously turned on. During this period of time, the strobe signal STB is not supplied from the controller 5 to the signal driver 20. Thus, the signal driver 20 is maintained in the high-impedance state with respect to the signal lines X1 to Xn. If potential differences occur between the pixel electrodes PE and the common electrodes CE, currents flow via the pixel switching elements W and electrostatic protection resistors Rcs and the potentials of the signal lines X1 to Xn are transitioned to a value approximately equal to the potential of the common electrode CE. The transition time τ at this time is determined by the product of the resistance of the electrostatic protection resistor Rcs and the pixel capacitance (liquid crystal capacitance Clc+storage capacitance Cst). The transition time τ is set within a one-frame period and the controller 5 controls the power supply circuit 6 to turn off the power source if a preset time corresponding to the transition time τ has elapsed from the output timing (fall point) of the all-selection signal ASEL. Specifically, as shown in FIG. 4, the off-voltage Vgoff is set to zero within 10 ms shorter than 16.7 ms which is the one-frame period and then the off-voltage Vgoff, on-voltage Vgon, analog system power source voltage AVDD and logic system power source voltage DVDD are set to zero in this order.

In the liquid crystal display device of the present embodiment, the display control circuit CNT simultaneously drives all of the scanning lines Y1 to Ym, transitions the potentials of the signal lines X1 to Xn to a value substantially equal to the potential of the common electrode CE in this state, and turns off the power source after a preset time required for the transition has elapsed. Thus, the potentials of the pixel electrodes PE can be set to a value substantially equal to the potential of the common electrode CE for a shorter period of time not exceeding 10 ms in the one-frame period in comparison with a case where the potentials of the pixel electrodes PX are transitioned in units of a pixel row to temporarily write white-display data and perform white display in the conventional manner. Therefore, the residual voltages of all of the liquid crystal pixels PX can be rapidly eliminated. That is, almost no persistence is observed after the off-operation of the power source switch PW.

The present invention is not limited to the above embodiment and can be variously modified without departing from the technical scope thereof.

In the above embodiment, the scan driver 10 simultaneously drives all of the scanning lines Y1 to Ym under the control of the all-selection signal ASEL in order that the signal driver 20 can be maintained in the high-impedance state after the turn-off operation of the power source switch PW. However, the vertical start signal STV can be continuously output from the controller 5 to the scan driver 10 to output selection signals from all of the output terminals of the shift register 11 in parallel. The frequency of the vertical clock signal CKV may be enhanced if necessary.

Further, the transition time $\tau$ is set by the product of the resistance of the electrostatic protection resistor Rcs and the pixel capacitance to simplify the configuration, but this invention is not limited to this case and the transition time can be set by use of another setting means.

This invention is applied to the reflective-type liquid crystal display panel DP but can be applied to a transreflective-type liquid crystal display panel using ambient light in addition to backlight to display an image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   a display control circuit comprising:
      a signal driver which drives a plurality of liquid crystal pixels arranged in substantially a matrix form, each of the liquid crystal pixels having liquid crystal held between a pixel electrode and a common electrode;
      a scan driver which drives a plurality of scanning lines arranged along the rows of liquid crystal pixels;
      a power supply circuit which outputs a logic-system power source voltage and an analog-system power source voltage; and
      a controller which controls the signal driver, the scan driver, and the power supply circuit; and
   a liquid crystal display panel which includes:
      a plurality of signal lines arranged along the columns of liquid crystal pixels; and
      a plurality of pixel switching elements arranged near intersections between the scanning lines and the signal lines, each of the pixel switching elements being driven via a corresponding scanning line to set the potential of a corresponding signal line to the pixel electrode of a corresponding liquid crystal pixel,
   wherein the controller is configured to:
      control the scan driver to drive all of the scanning lines to simultaneously turn on the pixel switching elements during a transition time of within 10 ms in response to off-operation of a power source switch,
      provide a discharge path for the pixel electrode,
      control the power supply circuit first to set the analog-system power source voltage to zero after the transition time has elapsed and then set the logic-system power source voltage to zero, and
      turn off a power source.

2. The liquid crystal display device according to claim 1, wherein:
   the power supply circuit further includes a gate-on power source which generates a gate-on voltage for urging the pixel switching elements to be conductive, and a gate-off power source which generates a gate-off voltage for urging the pixel switching elements to be non-conductive, and
   the controller controls the power supply circuit, in response to the off-operation of the power source switch, to set the off-voltage of the gate-off power source to zero within the transition time, and then set on-voltage of the gate-on power source, the analog-system power source voltage of the analog-system power source, and the logic-system power source voltage of the logic-system power source to zero in this order.

3. The liquid crystal display device according to claim 1, wherein the display control circuit has electrostatic protection resistors connected between the common electrode and the signal lines in the liquid crystal display panel.

* * * * *